US006992851B1

(12) United States Patent
Cloke

(10) Patent No.: US 6,992,851 B1
(45) Date of Patent: Jan. 31, 2006

(54) METHOD FOR NONSEQUENTIALLY WRITING REFERENCE SPIRAL SERVO PATTERNS TO A DISK TO COMPENSATE FOR DISK EXPANSION

(75) Inventor: Robert L. Cloke, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 10 days.

(21) Appl. No.: 10/882,844

(22) Filed: Jun. 30, 2004

(51) Int. Cl.
*G11B 21/02* (2006.01)

(52) U.S. Cl. ...................................................... 360/75
(58) Field of Classification Search ...................... None
See application file for complete search history.

(56) References Cited

U.S. PATENT DOCUMENTS 5,668,679 A  9/1997 Swearingen et al.
6,181,500 B1 * 1/2001 Serrano et al. ............... 360/53
6,507,450 B1  1/2003 Elliott \* cited by examiner

*Primary Examiner*—David Hudspeth
*Assistant Examiner*—Mitchell Slavitt
(74) *Attorney, Agent, or Firm*—Robroy R. Fawcett, Esq.

(57) ABSTRACT

A method is disclosed for reducing disk expansion effects while writing spiral reference patterns on a disk. The disk drive comprises control circuitry and a head disk assembly (HDA). In the method, an external spiral servo writer is used to control a radial location of the head for writing a plurality of the spiral reference patterns in an order such that at least two of the spiral reference patterns are not written temporally sequential to an adjacent spiral reference pattern. The head internal to the disk drive is used to read the spiral reference patterns in order to write product servo bursts to the disk, thereby defining a plurality of radially spaced, concentric data tracks.

22 Claims, 7 Drawing Sheets

METHOD FOR NONSEQUENTIALLY WRITING REFERENCE SPIRAL SERVO PATTERNS TO A DISK TO COMPENSATE FOR DISK EXPANSION

BACKGROUND OF THE INVENTION

1. Field of the Invention

The present invention relates to disk drives for computer systems. More particularly, the present invention relates to nonsequentially writing spiral reference patterns to compensate for thermal disk expansion during the pattern writing process.

2. Description of the Prior Art and Related Information

When manufacturing a disk drive, servo sectors $2_0$–$2_7$ are written to a disk 4 which define a plurality of radially-spaced, concentric data tracks 6 as shown in the prior art disk format of FIG. 1. Each servo sector (e.g., servo sector $2_4$) comprises a preamble 108 for synchronizing gain control and timing recovery, a sync mark 110 for synchronizing to a data field 112 comprising coarse head positioning information such as a track number, and product servo bursts 114 which provide fine head positioning information. During normal operation the product servo bursts 114 are processed by the disk drive in order to maintain a head over a centerline of a target track while writing or reading data. In the past, external servo writers have been used to write the product servo bursts 114 to the disk surface during manufacturing. External servo writers employ extremely accurate head positioning mechanics, such as a laser interferometer, to ensure the product servo bursts 114 are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various self servo writing methods wherein the internal electronics of the disk drive are used to write the product servo bursts independent of an external servo writer. For example, U.S. Pat. No. 5,668,679 teaches a disk drive which performs a self-servo writing operation by writing a plurality of spiral tracks to the disk which are then processed to write the product servo bursts along a circular path. The spiral tracks are written "open loop" by seeking the head from an outer diameter of the disk to an inner diameter of the disk. The disk drive calibrates acceleration/deceleration impulses to seek the head from the outer to inner diameter in a desired amount of time. Accurate radial positioning of the spiral tracks assumes the calibration process is accurate and that the calibrated acceleration/deceleration impulses will generate a repeatable response over multiple seeks. However, the calibration process will inevitably exhibit some degree of error and the dynamics of the disk drive will change between seeks inducing errors in the radial position of the spiral tracks. Dynamic errors which degrade the spiral tracks written during an open loop seek include vibration of the HDA, flutter and non-repeatable run-out of the disk and spindle bearings, stiction and non-repeatable run-out of the pivot bearings, windage on the head and arm, and flex circuit bias, windage, vibration, and temperature. Errors in writing the spiral tracks will propagate to the product servo bursts, thereby degrading the operating performance of the disk drive and reducing the manufacturing yield. Further, the '679 patent discloses to write the spiral tracks to the disk with a very steep slope over only one or two revolutions which reduces the accuracy of the head position error generated from the spiral tracks. Still further, each spiral track is written to the disk as a high frequency continuous signal (with missing bits), wherein the head position error is generated relative to time shifts in the detected location of the spiral tracks requiring a special timing recovery system as opposed to a conventional servo algorithm.

There is, therefore, a need to improve the servo writing process for a disk drive by reducing the bottleneck and expense of external servo writers while maintaining adequate operating performance and manufacturing yield.

SUMMARY OF THE INVENTION

The present invention may be embodied in a method for reducing disk thermal expansion effects while writing spiral reference patterns on a disk of a disk drive. The disk drive comprises control circuitry and a head disk assembly (HDA). The HDA comprises the disk, an actuator arm, a head connected to a distal end of the actuator arm, and a voice coil motor for rotating the actuator arm about a pivot to position the head radially over the disk. In the method, an external spiral servo writer is used to control a radial location of the head for writing a plurality of the spiral reference patterns in an order such that at least two of the spiral reference patterns are not written temporally sequential to an adjacent spiral reference pattern. The head internal to the disk drive is used to read the spiral reference patterns in order to write product servo bursts to the disk, thereby defining a plurality of radially spaced, concentric data tracks.

In more detailed features of the invention, the spiral reference patterns may be temporally written in a nonsequential order, or alternatively, in a pseudorandom order. Also, the plurality of spiral reference patterns may comprise n spiral paths and the temporal order that the spiral paths are written may follow the sequence: n, n−2, n−4, . . . , 4, 2, 1, 3, 5, . . . , n−3, n−1, where the temporal order number 1 is the first spiral path written and the temporal order number n is the last spiral path written. Alternatively, the sequence may be: n, n−2, n−4, . . . , 5, 3, 1, 2, 4, . . . , n−3, n−1; n−1, n−3, . . . , 4, 2, 1, 3, 5, . . . n−4, n−2, n; or n−1, n−3, . . . , 5, 3, 1, 2, 4, . . . n−4, n−2, n.

A head positioning pin of the external spiral servo writer may be inserted into the HDA before writing the spiral reference patterns. The head positioning pin is for engaging the actuator arm. The head positioning pin may be removed from the HDA after writing the spiral reference patterns so that the head internal to the disk drive may be used to read the spiral reference patterns in order to write the product servo bursts to the disk. The control circuitry of the disk drive may be used to process the spiral reference patterns in order to write the product servo bursts to the disk during a self-servo writing operation. Alternatively, an external product servo writer may be used to process the spiral reference patterns in order to write the product servo bursts to the disk. The product servo burst may be written in a substantially circular path.

Each spiral reference pattern may be written from an outer diameter of the disk to an inner diameter of the disk, or alternatively, from an inner diameter of the disk to an outer diameter of the disk. The spiral reference patterns may be written alternately from an inner diameter of the disk to an outer diameter of the disk and from an outer diameter of the disk to an inner diameter of the disk.

The reference servo bursts may be substantially contiguous in the radial direction from an outer diameter of the disk to an inner diameter of the disk. Each spiral reference pattern may comprise a plurality of reference servo bursts each having a plurality of high frequency transitions, and the reference servo bursts may be recorded at a periodic interval within each spiral reference pattern. This facilitates the use of a conventional servo algorithm for computing the head position error used for servoing while writing the product servo bursts to the disk.

A radial length of a product servo burst may define a data track, the product servo bursts may form a plurality of servo wedges, and a slope of each spiral reference pattern may equal approximately one data track per servo wedge. A slope of each spiral reference pattern may be selected so that each spiral reference pattern is equal to approximately one radial length of a product servo burst per servo wedge. Also, each spiral reference pattern may be written over at least twenty revolutions of the disk to increase the accuracy of the head position error generated from the reference servo bursts. The number of spiral reference patterns may equal the number of servo wedges.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
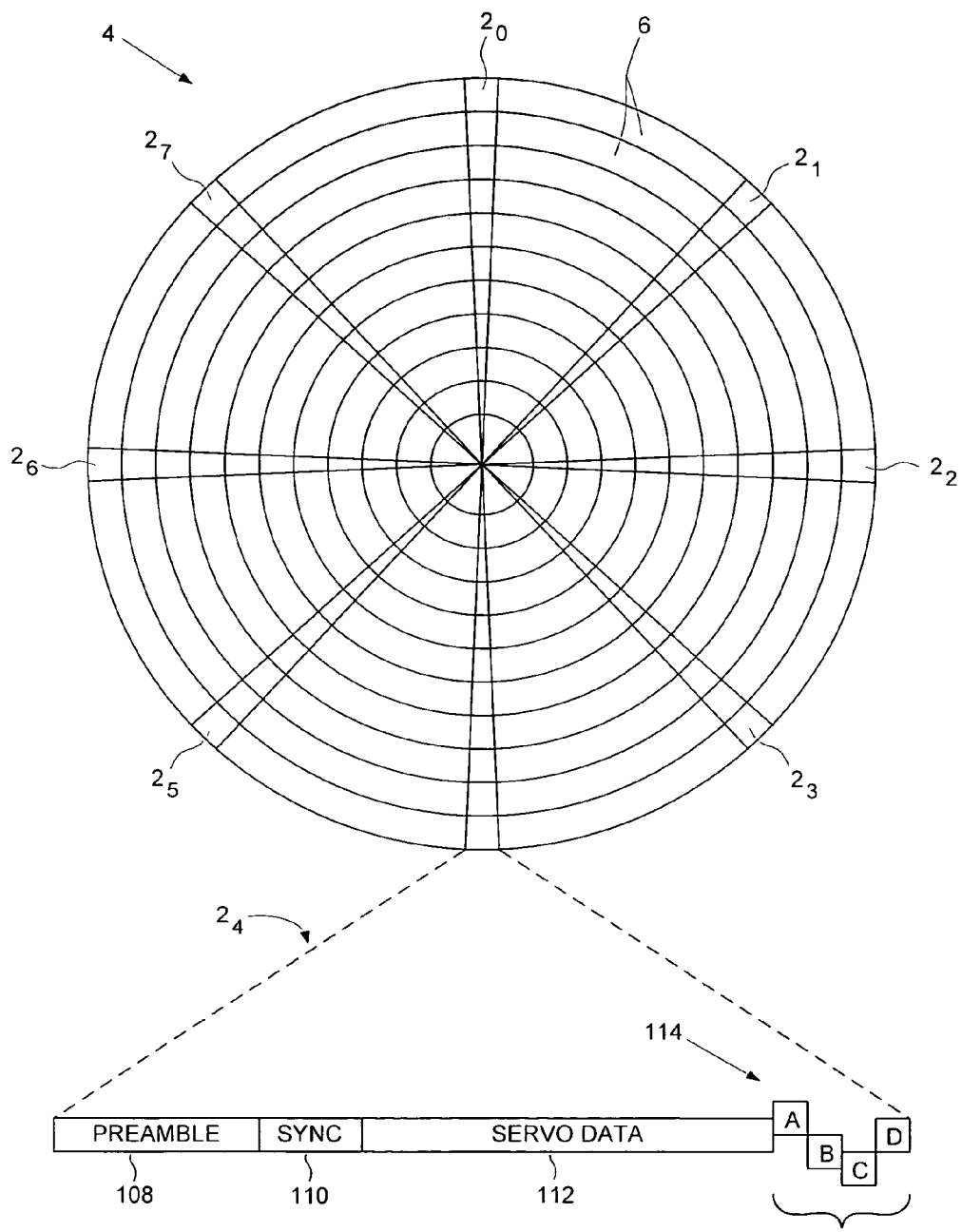
FIG. 1 shows a prior art format for a disk comprising a plurality of product servo bursts in servo sectors which define a plurality of radially spaced, concentric data tracks.
Figure 2:
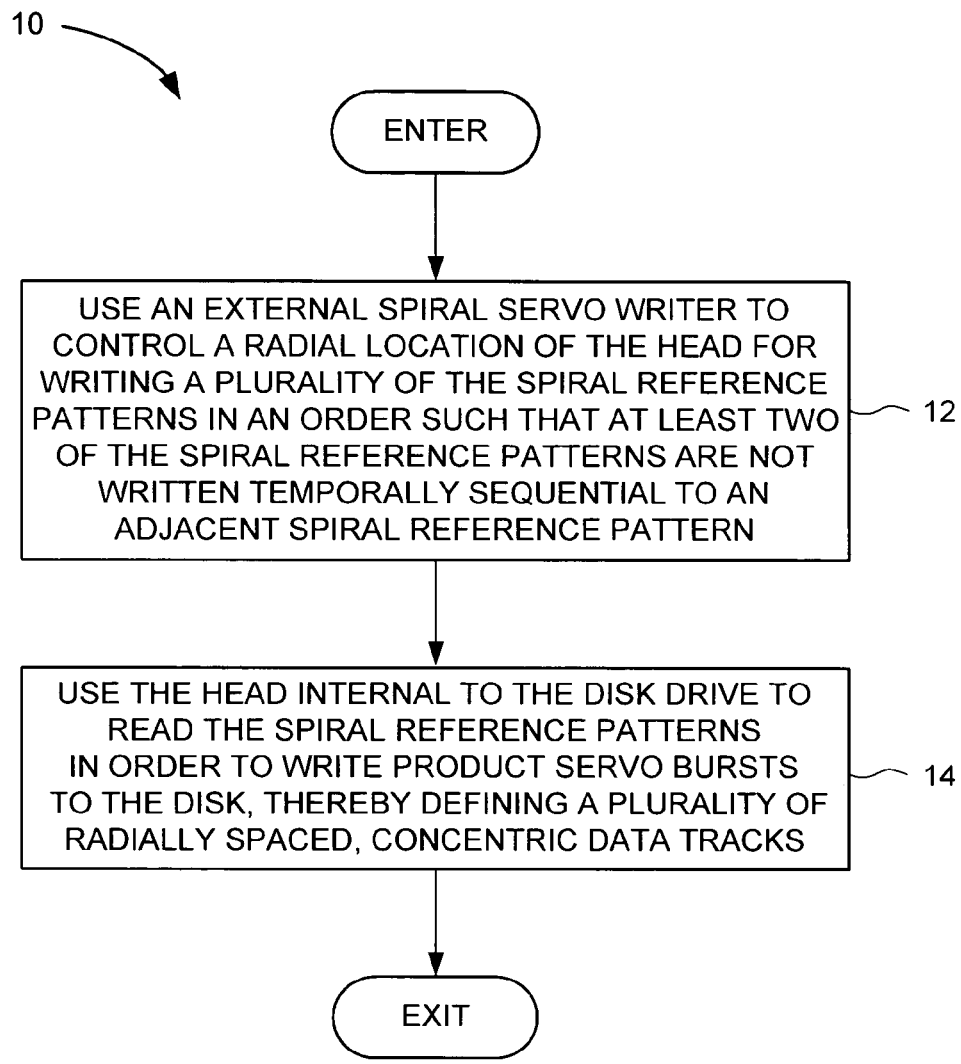
FIG. 2 shows a flow chart of a method for reducing disk expansion effects by nonsequentially writing spiral reference patterns, according to the present invention.
Figure 3:
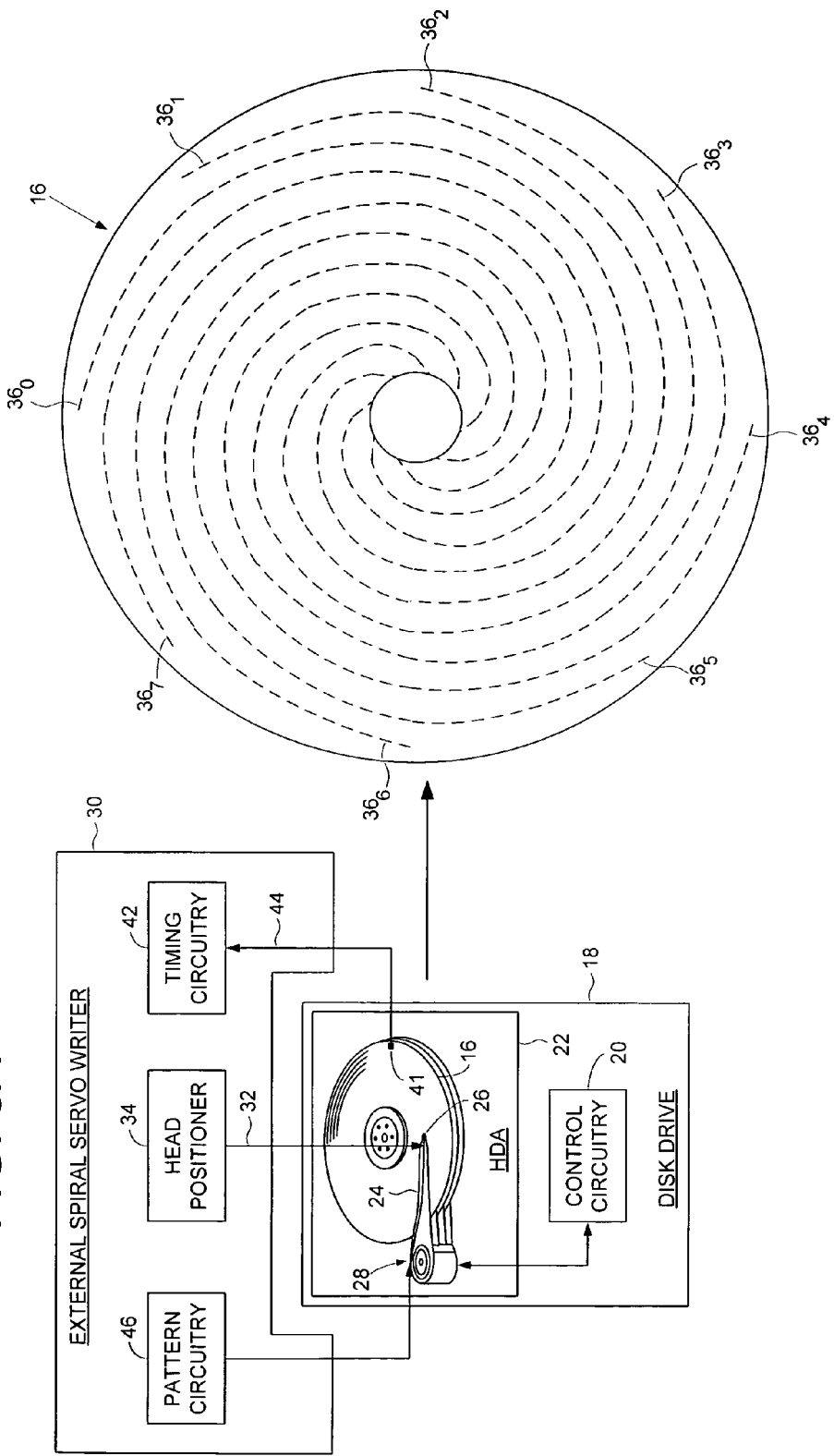
FIGS. 3A and 3B show an external spiral servo writer used to write a plurality of spiral reference patterns according to the method of FIG. 2.

With reference to FIGS. 1–4, the present invention may be embodied in a method 10 (FIG. 2) for reducing disk thermal expansion effects by nonsequentially writing spiral reference patterns $36_0$–$36_7$ (FIG. 3B) to a disk 16 of a disk drive 18 (FIG. 3A). The spiral reference patterns are used for forming product servo bursts $38_0$–$38_7$. The disk drive 18 comprises control circuitry 20 and a head disk assembly (HDA) 22 comprising the disk 16, an actuator arm 24, a head 26 connected to a distal end of the actuator arm 24, and a voice coil motor 28 for rotating the actuator arm 24 about a pivot to position the head 26 radially over the disk 16. In the method, an external spiral servo writer 30 is used to control a radial location of the head for writing a plurality of the spiral reference patterns in an order such that at least two of the spiral reference patterns are not written temporally sequential to an adjacent spiral reference pattern (step 12). The head internal to the disk drive is used to read the spiral reference patterns in order to write the product servo bursts to the disk, thereby defining a plurality of radially spaced, concentric data tracks 40 (step 14).

The plurality of spiral reference patterns $36_0$–$36_7$ may be temporally written in a nonsequential order, or alternatively, in a pseudorandom order. Also, the spiral reference patterns may comprise n spiral paths and the temporal order that the spiral paths are written may follow the sequence: n, n−2, n−4, . . . , 4, 2, 1, 3, 5, . . . , n−3, n−1, where the temporal order number 1 is the first spiral path written and the temporal order number n is the last spiral path written. Alternatively, the sequence may be: n, n−2, n−4, . . . , 5, 3, 1, 2, 4, . . . , n−3, n−1; n−1, n−3, . . . , 4, 2, 1, 3, 5, . . . n−4, n−2, n; or n−1, n−3, . . . , 5, 3, 1, 2, 4, . . . n−4, n−2, n.

During the process of the writing the spiral reference patterns $36_0$–$36_7$, a spindle motor (not shown) may generate heat that is conducted to the disk 16. The heat cause thermal expansion of the disk. This expansion can be on the order of several data tracks 40 so that a last written spiral reference pattern has a different profile or slope from a first written spiral reference pattern causing an abrupt discontinuity that may interfere with circular track following desired for writing the product servo bursts $38_0$–$38_7$. The techniques of the present invention attempt to avoid abrupt discontinuities in the slopes of adjacent spiral reference patterns.

A head positioning pin 32 of an external spiral servo writer 30 may be inserted into the HDA 22, the head positioning pin 32 for engaging the actuator arm 24. The external spiral servo writer 30 comprises head positioning mechanics 34 used to derive a radial location of the head 26. The head positioning pin 32 is actuated in response to the radial location of the head 26 in a closed loop system in order to position the head 26 radially over the disk 16 while writing a plurality of reference servo bursts to the disk along a plurality of substantially spiral paths to form the plurality of spiral reference patterns $36_0$–$36_7$ as illustrated in FIG. 3B. The head positioning pin 32 is removed from the HDA 22 and the head 26 internal to the disk drive 18 is used to read the reference servo bursts in the spiral reference patterns $36_0$–$36_7$ in order to write the product servo bursts $38_0$–$38_7$ to the disk 16 (FIG. 4), thereby defining the plurality of radially spaced, concentric data tracks 40.

Figure 4:
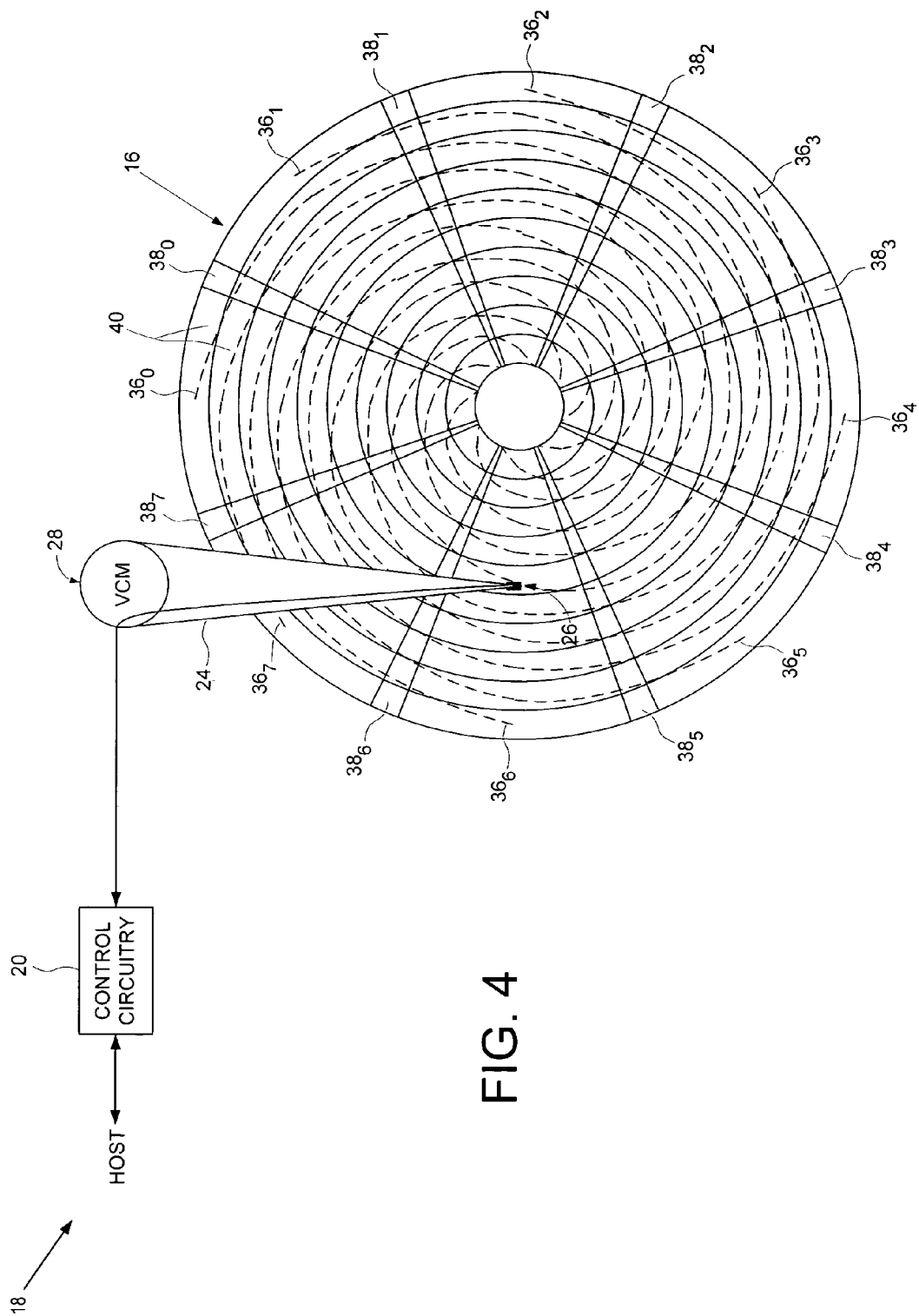
FIG. 4 shows a disk drive that processes the reference servo bursts in the spiral reference patterns to self-servo write product servo bursts to the disk.
Figure 6:
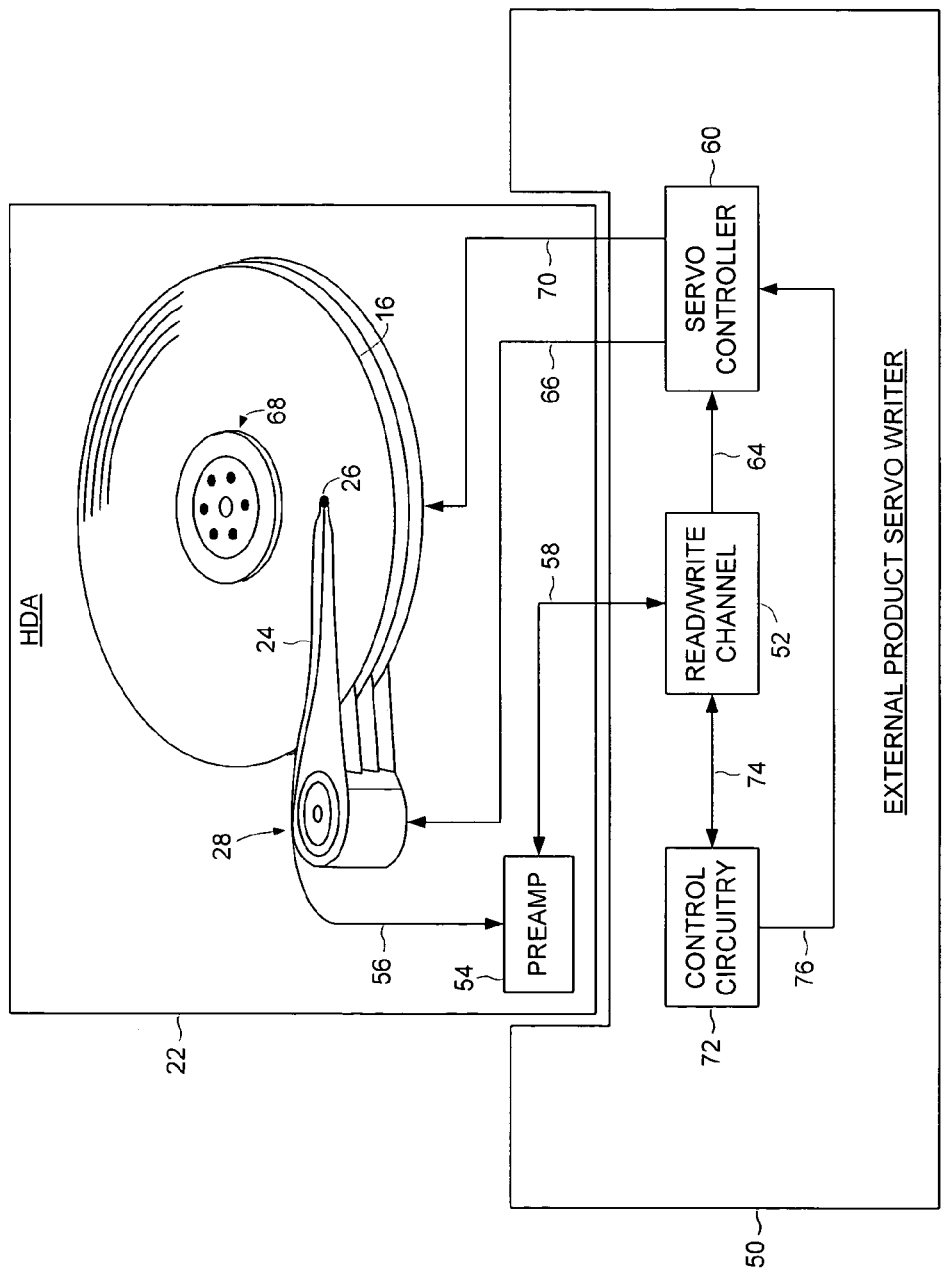
FIG. 6 shows an embodiment of the present invention wherein an external product servo writer is used to read the reference servo bursts in the spiral reference patterns in order to write the product servo bursts to the disk.

As shown in FIG. 4, the control circuitry 20 of the disk drive 18 may be used to read the reference servo bursts in the spiral reference patterns $36_0$–$36_7$ in order to write the product servo bursts $38_0$–$38_7$ to the disk 16 during a self-servo writing operation. With reference to FIG. 6, an external product servo writer 50 may be used to read the reference servo bursts in the spiral reference patterns $36_0$–$36_7$ in order to write the product servo bursts $38_0$–$38_7$ to the disk 16. The embodiment of FIG. 3A shows the entire disk drive 18 inserted into the external spiral servo writer 30 while writing the spiral reference patterns $36_0$–$36_7$ to the disk 16. In another embodiment, only the HDA 22 may be inserted into the external spiral servo writer 30, wherein a printed circuit board assembly (PCBA) comprising the control circuitry 20 is mounted to the HDA 22 after the external servo writer 30 writes the spiral reference patterns $36_0$–$36_7$ to the disk 16.

The head positioning pin 32 may be connected to the actuator arm 24 by applying a small amount of current to the voice coil motor 28 in order to bias the actuator arm 24 against the head positioning pin 32. In one embodiment, the head positioning mechanics 34 comprises a laser interferometer for generating the radial location of the head 26, however, any suitable device for generating the radial location of the head 26 may be employed. In the embodiment of FIG. 3A, the external servo writer 30 comprises a clock head 41 which is also inserted into the HDA 22 for reading a clock track recorded on an outer diameter of the disk 16. Timing circuitry 42 within the external servo writer 30 processes the signal 44 from the clock head 41 in order to write the reference servo bursts at the appropriate circumferential location. Pattern circuitry 46 within the external servo writer 30 generates the reference servo burst pattern applied to the head 26 at the appropriate time.

Each spiral reference pattern 36 may be written from an outer diameter of the disk 16 to an inner diameter of the disk 16, or from an inner diameter of the disk 16 to an outer diameter of the disk 16. Alternatively, the spiral reference patterns $36_0$–$36_7$ are written alternately from an inner diameter of the disk 16 to an outer diameter of the disk 16 and from an outer diameter of the disk 16 to an inner diameter of the disk 16.

The number of spiral reference patterns $36_0$–$36_N$ as well as the slope of each spiral reference pattern 36i are selected so that the external spiral servo writer 30 can process the disk drive 18 in a significantly shorter time period as compared to writing a complete set of product servo bursts $38_0$–$38_7$ to the disk 16. This increases the throughput of the external spiral servo writer 30 by having the disk drives self-servo write the product servo bursts $38_0$–$38_7$ using the spiral reference patterns $36_0$–$36_7$ while avoiding errors inherent in having the disk drive write the spiral reference patterns $36_0$–$36_7$.

Figure 5:
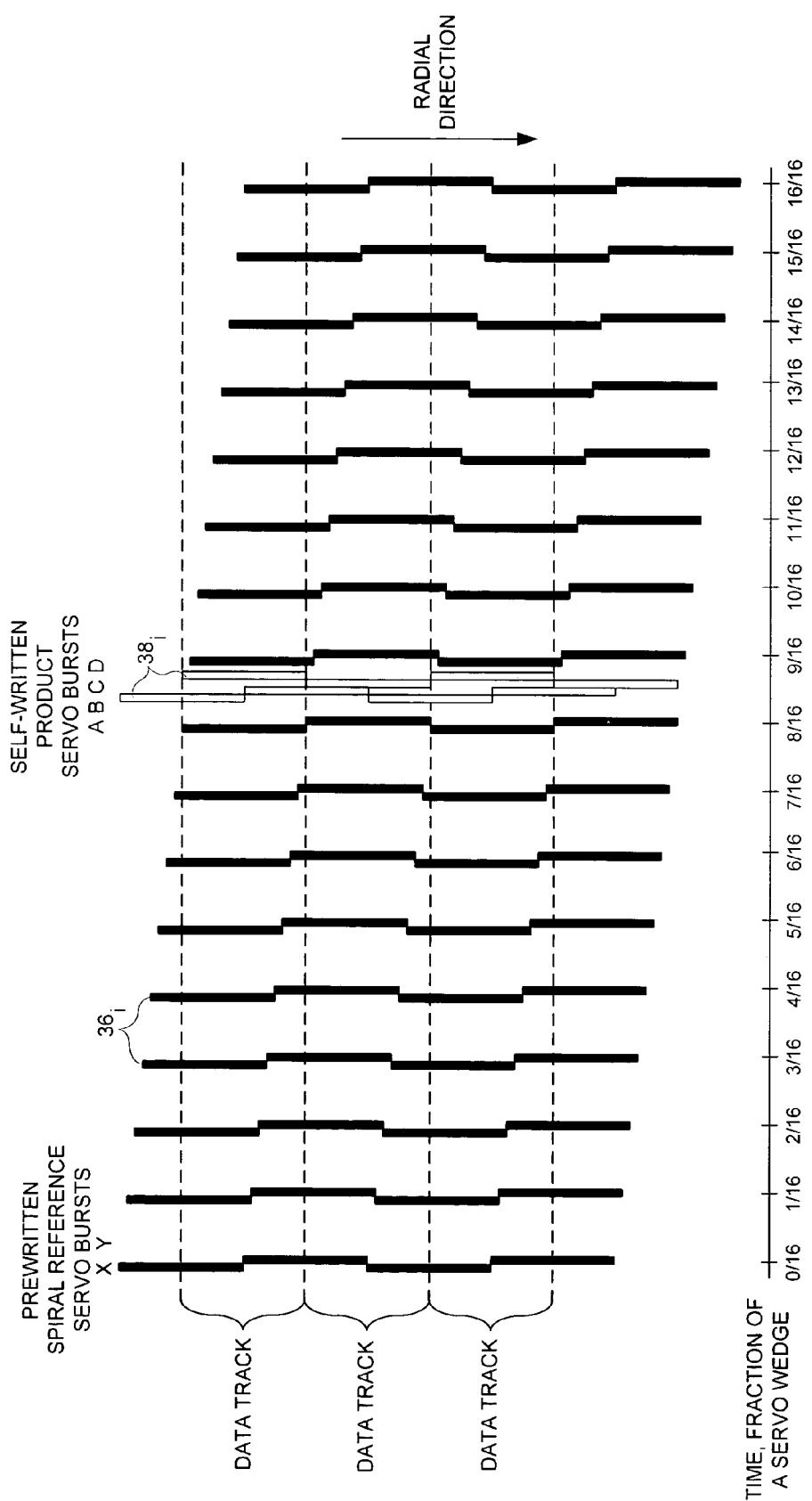
FIG. 5 shows an embodiment of the present invention wherein a slope of each spiral reference pattern equals one data track per servo wedge.

FIG. 5 illustrates an embodiment of the present invention wherein a radial length of a product servo burst $38_i$ defines a data track. The product servo bursts $38_0$–$38_7$ form a plurality of servo wedges which extend from servo sector to servo sector (e.g., from product servo bursts $38_0$ to product servo bursts $38_1$ in FIG. 4). A slope of each spiral reference pattern $36_i$ equals approximately one data track per servo wedge or approximately one radial length of a product servo burst $38_i$ per servo wedge. In the embodiment of FIG. 5, sixteen reference servo bursts are written in each spiral reference pattern $36_i$ between every set of product servo bursts $38_i$–$38_{i+1}$ (one per every 1/16 of a servo wedge time). Also in the embodiment of FIG. 5, the number of spiral reference patterns $36_N$ equals the number of servo wedges so that the reference servo bursts are substantially contiguous in the radial direction. The external spiral servo writer 30 performs a number of seeks equal to the number of servo wedges in order to write each of the spiral reference patterns $36_0$–$36_N$ in a number of revolutions equal to the number of data tracks divided by the number of servo wedges. In other words, in the embodiment of FIG. 5 the spiral reference patterns $36_0$–$36_N$ are written to the disk 16 in a number of revolutions equal to the number of data tracks, which is half the number of revolutions required to write a full set of product servo bursts as in the prior art.

The slope of each spiral reference pattern $36_0$–$36_N$ may be selected so that each spiral reference pattern $36_0$–$36_N$ is written over at least twenty revolutions of the disk 16 to increase the accuracy of the head position error generated from the reference servo bursts. In the embodiment of FIG. 5 wherein a slope of each spiral reference pattern $36_i$ equals approximately one data track per servo wedge, each spiral reference pattern $36_0$–$36_N$ is written over a number of revolutions approximately equal to the number of data tracks divided by the number of servo wedges. For example, if the disk 16 comprises 10,000 data tracks and 100 servo wedges, each spiral reference pattern $36_i$ is written over approximately 100 revolutions of the disk 16.

In the embodiment of FIG. 5, the product servo bursts $36_0$–$36_N$ are written along a substantially circular path while tracking the spiral reference patterns $36_0$–$36_N$. The control circuitry 20 of FIG. 4 computes a position error for the head 26 with respect to a circular trajectory in response to the reference servo bursts. Because the reference servo bursts are similar in composition to the product servo bursts (high frequency transitions denoted by the black bars in FIG. 5 recorded at a periodic interval) and because the reference servo bursts are substantially contiguous in the radial direction as shown in FIG. 5, a conventional servo algorithm may be employed to compute the head position error (e.g., an algorithm similar to that used to compute the head position error from the product servo bursts $38_0$–$38_N$ during normal operation of the disk drive). The head position error is input to a servo control system which generates the appropriate control signal applied to the voice coil motor 28. The algorithm for computing the head position error is continuously updated relative to the circumferential location of the head 26 to account for the spiral trajectory of the reference servo bursts in the spiral reference patterns $36_0$–$36_N$. In one embodiment, a timing clock is generated in response to the reference servo bursts, wherein the timing clock is used to write the product servo bursts $36_0$–$36_N$ at the appropriate circumferential location on the disk 16. In another embodiment, the external spiral servo writer 30 writes a periodic clock signal together with the spiral reference patterns $36_0$–$36_N$, wherein the periodic clock signal is processed in order to generate the timing clock used to write the product servo bursts $36_0$–$36_N$ at the appropriate circumferential location on the disk 16.

FIG. 6 shows an embodiment of the present invention wherein after writing the spiral reference patterns $36_0$–$36_N$ to the disk 16 (FIGS. 3A–3B), the HDA 22 is inserted into an external product servo writer 50 comprising suitable circuitry for reading and processing the spiral reference patterns $36_0$–$36_N$ in order to write the product servo bursts $36_0$–$36_N$ to the disk 16. The external product servo writer 50 comprises a read/write channel 52 for interfacing with a preamp 54 in the HDA 22. The preamp 54 amplifies a read signal emanating from the head 26 over line 56 to generate an amplified read signal applied to the read/write channel 52 over line 58. The read/write channel 52 comprises suitable circuitry/software for measuring the reference servo bursts (e.g., integration circuitry/software) and for transmitting a signal representing the reference servo bursts to a servo controller 60 over line 64. The servo controller 60 processes the reference servo burst signals to generate a head position error. The head position error is used to generate a VCM control signal applied to the VCM 28 over line 66 in order to maintain the head 26 along a circular trajectory. The servo controller 60 also generates a spindle motor control signal applied to a spindle motor 68 over line 70 to maintain the disk 16 at a desired angular velocity. Control circuitry 72 processes information received from the read/write channel 52 over line 74 associated with the reference servo bursts (e.g., timing information) and provides the product servo burst patterns to the read/write channel 52 at the appropriate time. The product servo bursts patterns are provided to the preamp 54 which modulates a current in the head 26 in order to write the product servo bursts $38_0$–$38_N$ to the disk 16. The control circuitry 72 also transmits control information over line 76 to the servo controller 60, such as the target servo track to be written. After writing the product servo bursts $36_0$–$36_N$ to the disk 16, the HDA 22 is removed from the external product servo writer 50 and a printed circuit board assembly (PCBA) comprising the control circuitry 20 (FIG. 3A) is mounted to the HDA 22.

Figure 7:
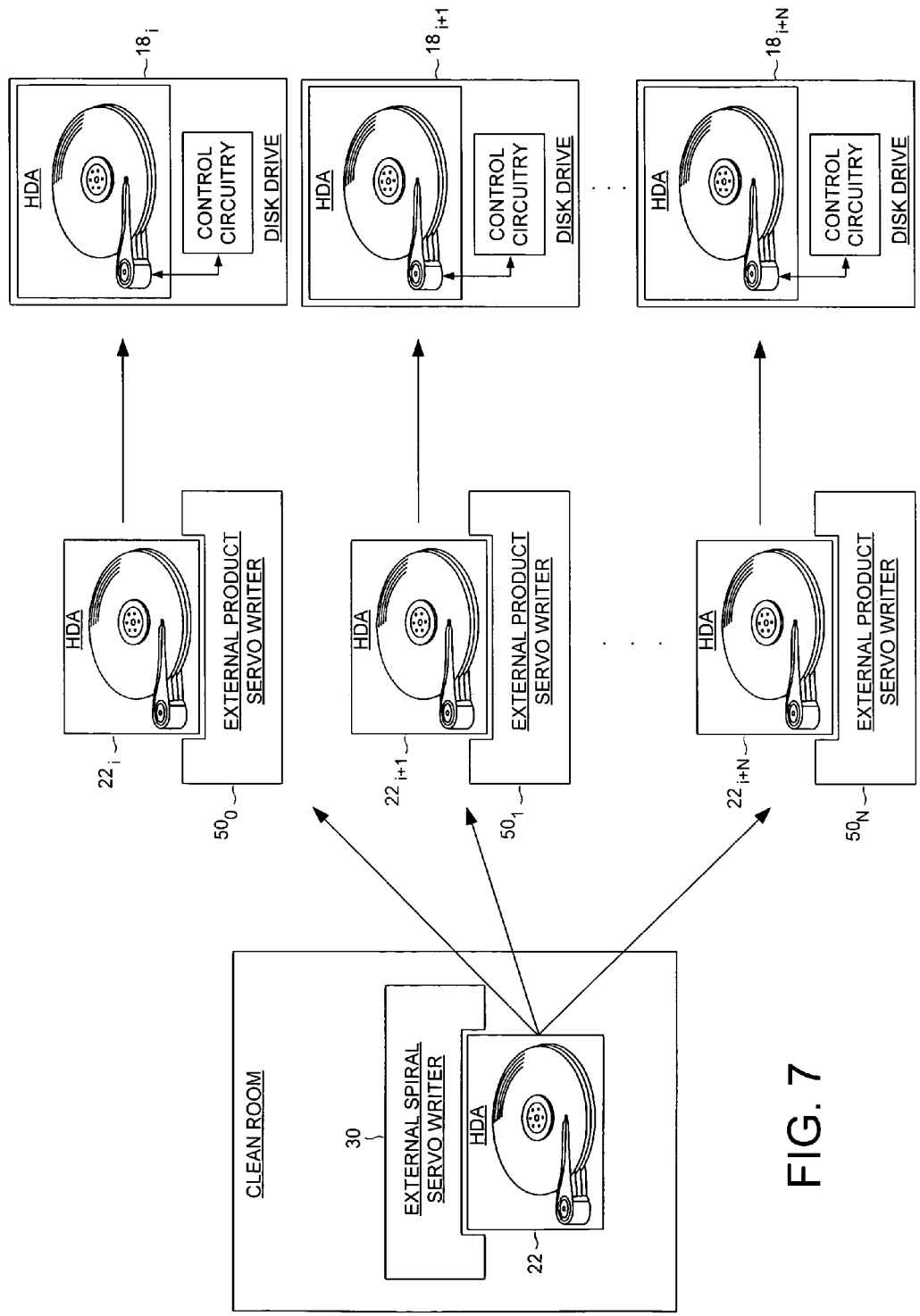
FIG. 7 shows an embodiment of the present invention wherein a plurality of external product servo writers process the HDAs output by an external spiral servo writer.

In one embodiment, the external product servo writer 50 of FIG. 6 interfaces with the HDA 22 over the same connections as the control circuitry 20 to minimize the modifications needed to facilitate the external product servo writer 50. The external product servo writer 50 is less expensive than a conventional servo writer because it does not require a clean room or sophisticated head positioning mechanics. In an embodiment shown in FIG. 7, a plurality of external product servo writers $50_0$–$50_N$ process the HDAs $22_{i-i+N}$ output by an external spiral servo writer 30 in order to write the product servo bursts less expensively and more efficiently than a conventional servo writer. This embodiment may provide a further reduction in cost since the circuitry and software for processing the reference servo bursts in order to write the product servo bursts are implemented in the external product servo writer 50 and not replicated in each disk drive as in the embodiment of FIG. 4.

What is claimed is:

1. A method for reducing disk expansion effects while writing spiral reference patterns on a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the method comprising:

using an external spiral servo writer to control a radial location of the head for writing a plurality of the spiral reference patterns in an order such that at least two of the spiral reference patterns are not written temporally sequential to an adjacent spiral reference pattern; and using the head internal to the disk drive to read the spiral reference patterns in order to write product servo bursts to the disk, thereby defining a plurality of radially spaced, concentric data tracks.

2. The method as recited in claim 1, further comprising inserting a head positioning pin of the external spiral servo writer into the HDA before writing the spiral reference patterns, the head positioning pin for engaging the actuator arm.

3. The method as recited in claim 1, wherein the spiral reference patterns are temporally written in a nonsequential order.

4. The method as recited in claim 1, wherein the reference patterns are temporally written in a pseudorandom order.

5. The method as recited in claim 1, wherein the plurality of spiral reference patterns comprise n spiral paths and the temporal order that the spiral paths are written follows the sequence: n, n−2, n−4, . . . , 4, 2, 1, 3, 5, . . . , n−3, n−1, where the temporal order number 1 is the first spiral path written and the temporal order number n is the last spiral path written.

6. The method as recited in claim 1, wherein the plurality of spiral reference patterns comprise n spiral paths and the temporal order that the spiral paths are written follows the sequence: n, n−2, n−4, . . . , 5, 3, 1, 2, 4, . . . , n−3, n−1, where the temporal order number 1 is the first spiral path written and the temporal order number n is the last spiral path written.

7. The method as recited in claim 1, wherein the plurality of spiral reference patterns comprise n spiral paths and the temporal order that the spiral paths are written follows the sequence: n−1, n−3, . . . , 4, 2, 1, 3, 5, . . . n−4, n−2, n, where the temporal order number 1 is the first spiral path written and the temporal order number n is the last spiral path written.

8. The method as recited in claim 1, wherein the plurality of spiral reference patterns comprise n spiral paths and the temporal order that the spiral paths are written follows the sequence: n−1, n−3, . . . , 5, 3, 1, 2, 4, . . . n−4, n−2, n, where the temporal order number 1 is the first spiral path written and the temporal order number n is the last spiral path written.

9. The method as recited in claim 1, wherein the control circuitry of the disk drive is used to process the spiral reference patterns in order to write the product servo bursts to the disk during a self-servo writing operation.

10. The method as recited in claim 1, wherein an external product servo writer is used to process the spiral reference patterns in order to write the product servo bursts to the disk.

11. The method as recited in claim 1, wherein the external spiral servo writer comprises a laser interferometer for deriving the radial location of the head.

12. The method as recited in claim 1, wherein each spiral reference pattern is written from an outer diameter of the disk to an inner diameter of the disk.

13. The method as recited in claim 1, wherein each spiral reference pattern is written from an inner diameter of the disk to an outer diameter of the disk.

14. The method as recited in claim 1, wherein the spiral reference patterns are written alternately from an inner diameter of the disk to an outer diameter of the disk and from an outer diameter of the disk to an inner diameter of the disk.

15. The method as recited in claim 1, wherein the product servo bursts are written in a substantially circular path.

16. The method as recited in claim 1, wherein:
   a radial length of a product servo burst defines a data track;
   the product servo bursts form a plurality of servo wedges; and
   a slope of each spiral reference pattern equals approximately one data track per servo wedge.

17. The method as recited in claim 16, wherein the number of spiral reference patterns equals the number of servo wedges.

18. The method as recited in claim 1, wherein:
   the product servo bursts form a plurality of servo wedges; and
   a slope of each spiral reference pattern equals approximately one radial length of a product servo burst per servo wedge.

19. The method as recited in claim 18, wherein the number of spiral reference patterns equals the number of servo wedges.

20. The method as recited in claim 1, wherein each spiral reference pattern is written over at least twenty revolutions of the disk.

21. The method as recited in claim 1, wherein:
   each spiral reference pattern comprises a plurality of reference servo bursts;
   each reference servo burst comprises a plurality of high frequency transitions; and
   the reference servo bursts are recorded at a periodic interval within each spiral reference pattern.

22. The method as recited in claim 21, wherein the reference servo bursts are substantially contiguous in the radial direction from an outer diameter of the disk to an inner diameter of the disk.

* * * * *